United States Patent [19]

Tantillo et al.

[11] Patent Number: 4,519,052
[45] Date of Patent: May 21, 1985

[54] ELECTRONIC ROLL-A-LONG SWITCH

[75] Inventors: Donnie J. Tantillo, Houston; David F. Kratochvil, Sugarland; Robert G. Moore; Edward M. Browne, both of Houston, all of Tex.

[73] Assignee: Geosource Inc., Houston, Tex.

[21] Appl. No.: 274,216

[22] Filed: Jun. 16, 1981

[51] Int. Cl.³ .................. G01V 1/22; H04Q 11/04
[52] U.S. Cl. .................. 367/79; 340/870.13; 367/59
[58] Field of Search .......... 367/78, 79, 59, 60, 367/76, 56; 340/870.13, 870.14, 870.15

[56] References Cited

U.S. PATENT DOCUMENTS

| | | | |
|---|---|---|---|
| 3,075,607 | 12/1958 | Aitken et al. | 367/78 |
| 3,088,541 | 5/1963 | Alexander et al. | 367/56 X |
| 3,618,000 | 11/1971 | Carruth | 367/79 |
| 3,930,145 | 12/1975 | Fort et al. | 367/79 X |
| 3,986,008 | 10/1976 | Fort et al. | 367/60 X |
| 4,023,140 | 3/1977 | Siems et al. | 340/870.13 |
| 4,084,151 | 4/1978 | Penner | 367/60 |
| 4,140,993 | 2/1979 | Carter | 367/76 |
| 4,146,750 | 3/1979 | Spiesman | 340/870.13 |
| 4,280,201 | 7/1981 | Mart et al. | 367/59 |
| 4,285,052 | 8/1981 | Bobbitt | 367/79 |
| 4,296,464 | 10/1981 | Woods et al. | 364/200 |
| 4,308,598 | 12/1981 | Mahmood | 367/79 |

Primary Examiner—Maynard R. Wilbur
Assistant Examiner—K. R. Kaiser
Attorney, Agent, or Firm—Arnold, White & Durkee

[57] ABSTRACT

An electronic roll-a-long switch for use in a seismic exploration system and method of seismic exploration are disclosed. For a group of N sequentially numbered receiver points, N/2 input channels are provided. Each input channel receives input from one of two receiver points which are spaced N/2 receiver points apart. The input channels are multiplexed to a data bus in an order corresponding to the sequential numbers of the receiver points comprising the input channels.

12 Claims, 8 Drawing Figures

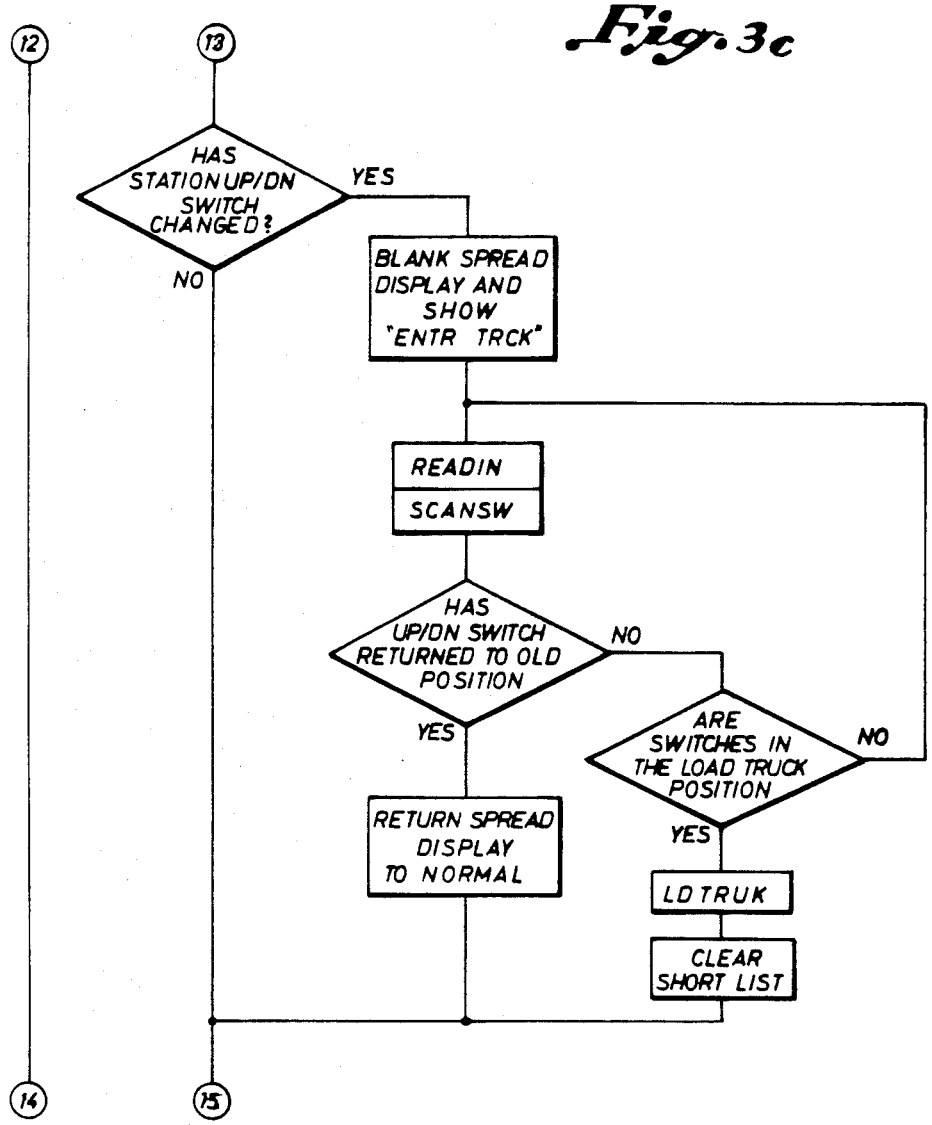

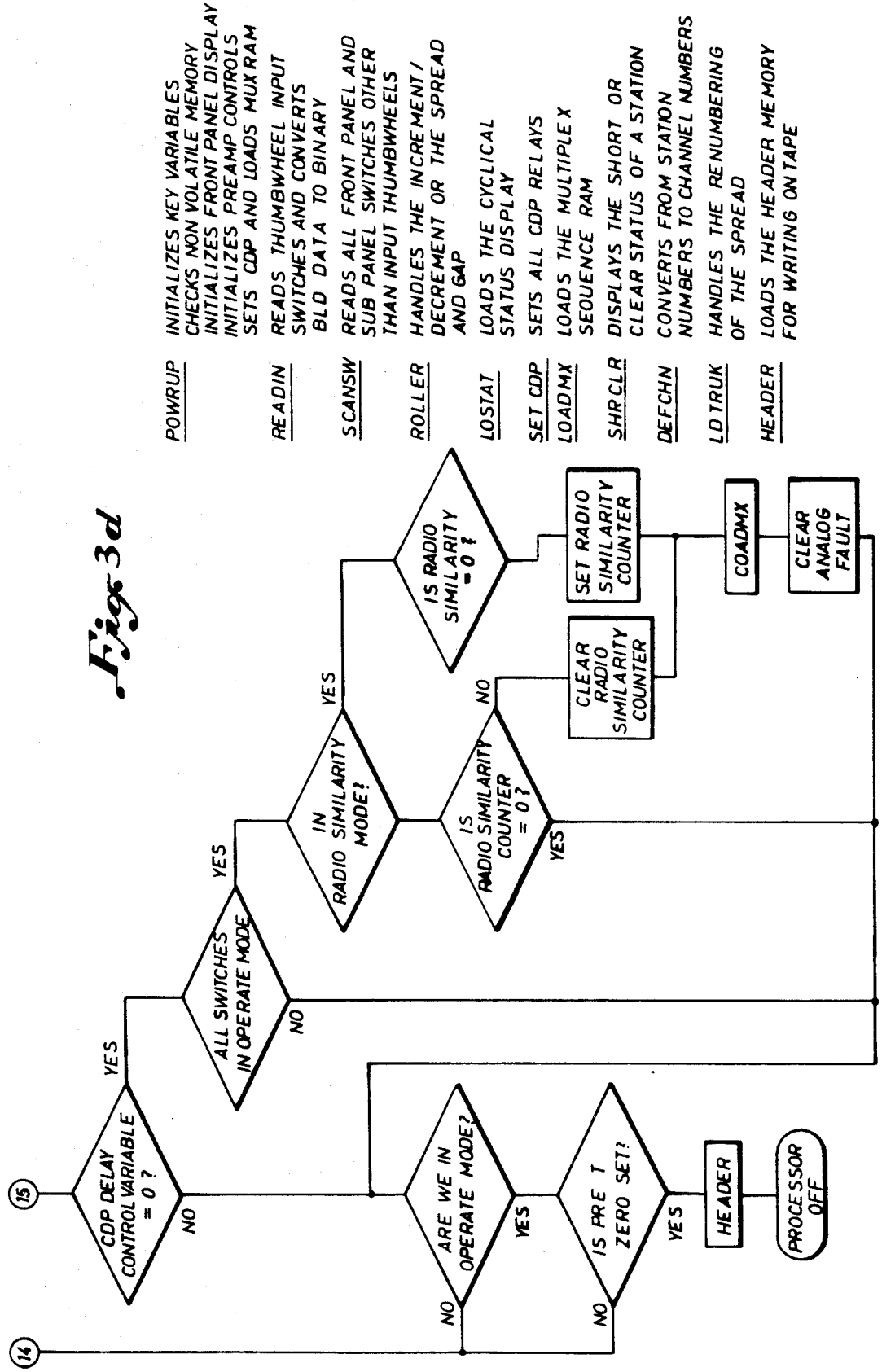

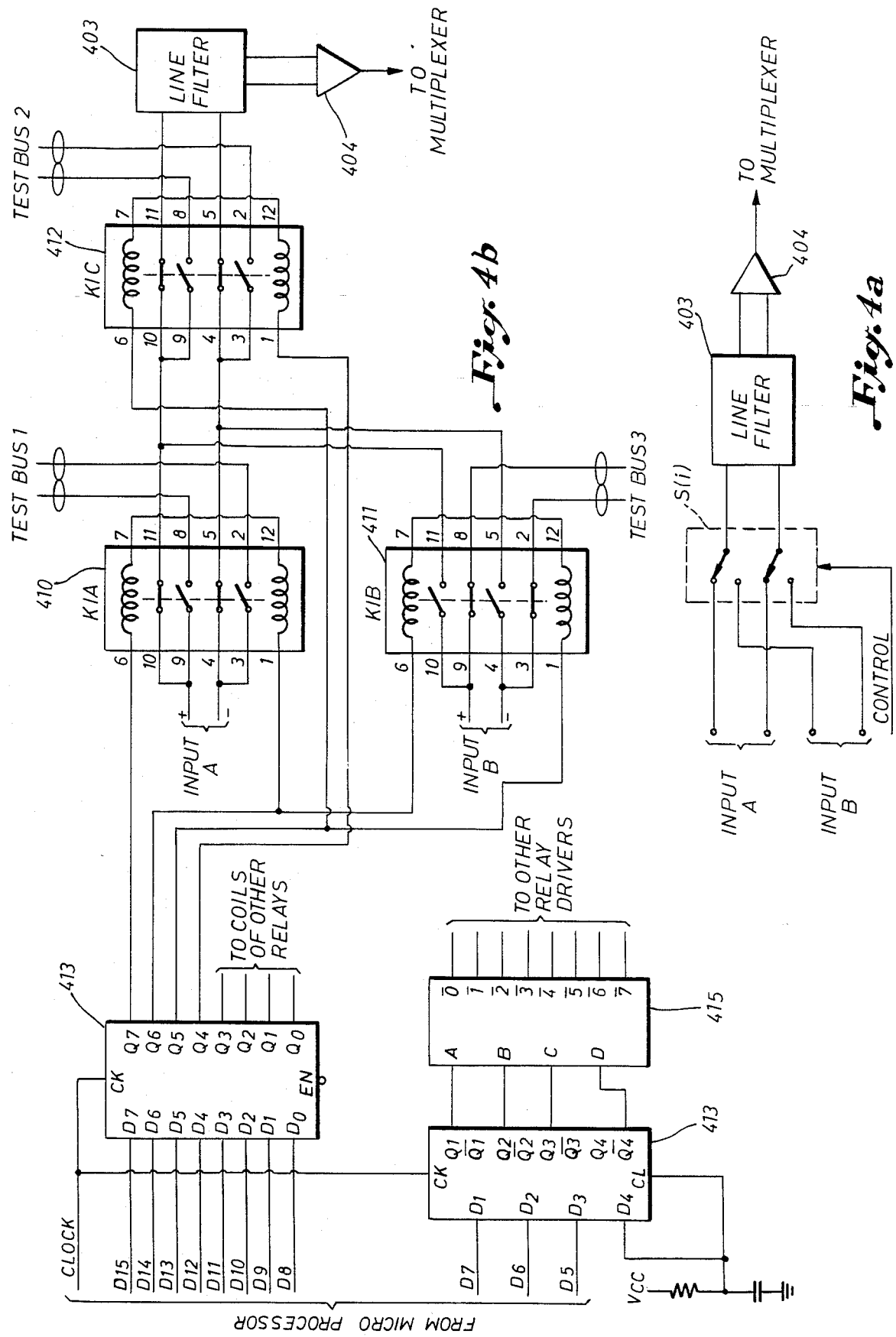

ELECTRONIC ROLL-A-LONG SWITCH

BACKGROUND OF THE INVENTION

1. Field of the Invention

This invention relates to apparatus and methods for seismic prospecting, and, more particularly, to an electronic roll-a-long switch and method of using same.

2. Description of the Prior Art

In seismic exploration, sound waves are commonly used to probe the earth's crust as a means of determining the types and location of subsurface formations. The earth's crust can be considered a transmission medium or filter whose characteristics are to be determined by passing sound waves through that medium. In the reflection seismic method, sound disturbances are made at a transmission point at or near the earth's surface, and sound waves which are reflected from subsurface reflecting boundaries are detected by seismic detectors, e.g., geophones, which generate electrical signals at their outputs. Information relating to subsurface formations is contained in these electrical signals, and the signals are recorded in a form which permits analysis. Skilled interpreters can discern from the analysis the shape and depth of subsurface reflection boundaries and the likelihood of finding an accumulation of minerals, such as oil and gas.

In a typical seismic field recording system, the arrays of seismic detectors are located at regularly spaced intervals along that portion of the earth's surface under consideration. A typical seismic exploration system also includes a recording truck and and a multi-pair cable, which is used to connect the outputs of the detector arrays to the recording truck. Typically, a pair of wires is "taken out" of the recording cable for appropriate connection to the output of each array. The location at which a given pair is taken out of the cable has been referred to by such designations as "receiver point", "receiver station", or "station". In this application such a location is designated a "receiver point". Typically, the receiver points are given sequential numbers, e.g., from 1 to N, where N is the total number of receiver points in the system. The data obtained at each receiver point from the output of an array of detectors forms a "channel" of information, which is provided to the recording apparatus.

In a typical seismic system, the total number of receiver points exceeds the channel capacity of the recording apparatus in the recording truck. Accordingly, data are not recorded from all receiver points in response to each seismic disturbance. Rather, responsive to each disturbance, data are recorded from a number of receiver points equal to the channel capacity of the recording equipment in the recording truck. The length of time that data are recorded responsive to a seismic disturbance is known as the record interval, and a typical record interval may be on the order of 6 to 10 seconds. During a record interval time, the outputs of the receiver points providing data to the recording system are sampled periodically and the samples are recorded. The time between successive samples on the same channel is called the channel sample time. It is common for the channel sample time to be 1 millisecond, 2 milliseconds, or 4 milliseconds. Thus, during a record interval of 6 to 10 seconds, data are sampled and recorded for each channel a substantial number of times.

Included in the recording truck is apparatus which selects the group of receiver points from which data are to be recorded during a given record interval. Such apparatus is commonly referred to as a "roll-a-long switch". Heretofore, roll-a-long switches have generally been mechanical in construction. That is, mechanical switches having contacts have been used to implement roll-a-long switches in prior art devices. These mechanical switches are subject to damage through wear and due to extreme environmental conditions, corrosion, and dust. All of the above factors adversely affect the ability to obtain accurate seismic data.

The shortcomings of such prior art roll-a-long switches have been overcome with the present invention.

SUMMARY OF THE INVENTION

In accordance with the present invention, an electronic roll-a-long switch is provided for use in a seismic exploration system.

Such a system includes N receiver points for receiving signals from seismic detectors, and the N receiver points are sequentially numbered and located at spaced intervals along the earth's surface. The system also includes a recording apparatus having a channel capacity of M channels.

An embodiment of the electronic roll-a-long switch in accordance with the present invention includes N/2 input channels for receiving signals from a group of N/2 receiver points. Each input channel may receive data from one of two receiver points, and selection circuitry is provided in each input channel for selecting which one of the two receiver points is to be connected to the input channel. The two receiver points connected to each channel are spaced N/2 receiver points apart. Each input channel further comprises a multiplexer for time multiplexing the signal on each input channel to a signal bus.

An embodiment of the electronic roll-a-long switch in accordance with the present invention further comprises timing and control circuitry for operating the multiplexer during a record interval time to select a group of M channels from the N/2 input channels to be data channels. The timing and control circuitry further operates to connect the group of M data channels to the signal bus in a sequential order corresponding to the sequential numbers of the receiver points from which the group of M data channels were selected. Further, the timing and control circuitry operates to change the group of N/2 receiver points which are connected to the input channels during a subsequent record interval time. In a preferred embodiment of the present invention, the timing and control apparatus comprises a microcomputer which is appropriately programmed to obtain the above operational characteristics.

In accordance with the present invention, a method of gathering seismic data is also provided for a seismic exploration system having N receiver points, which are sequentially numbered and which are located at spaced intervals on the earth's surface, and having a channel recording capacity of M channels.

In accordance with the method of the present invention, an electronic roll-a-long switch having N/2 input channels is provided, and N/2 of the receiver points are connected to the input channels. The method of the present invention further comprises multiplexing M of the N/2 input channels to a signal bus during a record interval time. The multiplexing occurs in a sequence corresponding to the sequence numbers of the receiver points constituting the M data channels. Lastly, the method of the present invention comprises changing the group of N/2 receiver points which are connected to the input channels of the roll-a-long switch during a subsequent record interval time.

BRIEF DESCRIPTION OF THE DRAWINGS

In the accompanying drawings

FIGS. 3a–3d constitute a flow diagram which illustrates and defines the operation of the microcomputer which controls various elements of the roll-a-long switch of FIG. 2.

FIG. 4a is an electrical schematic of a portion of an input channel in one embodiment of the present invention.

FIG. 4b is an electrical schematic of a portion of an input channel in a presently preferred embodiment of the present invention.

DESCRIPTION OF SPECIFIC EMBODIMENTS

It will be appreciated that the present invention can take many forms and embodiments. Some embodiments of the invention are described so as to give an understanding of the invention. It is not intended that the illustrative embodiments set forth herein should in any way limit the true scope and spirit of the invention.

Figure 1:
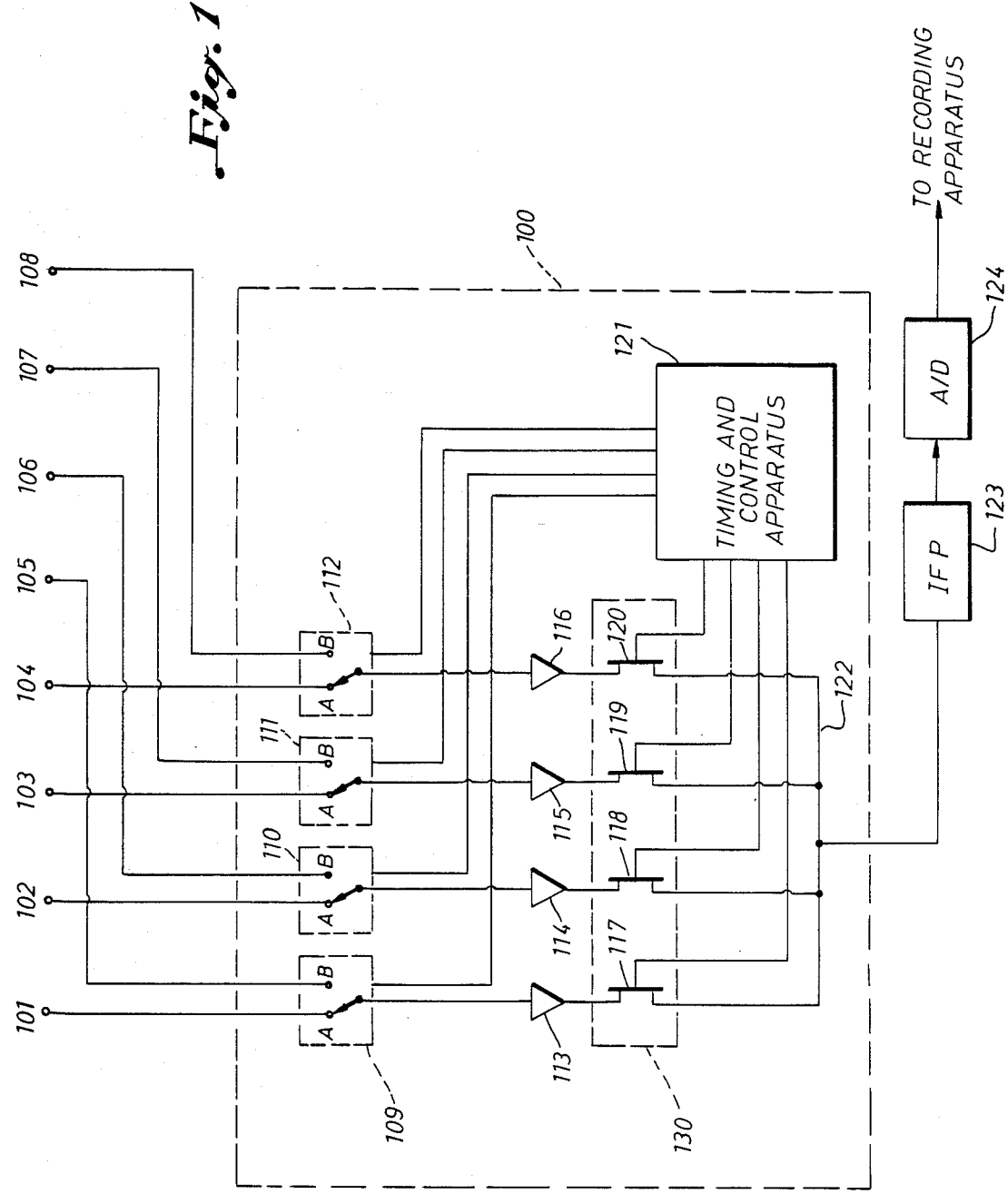
FIG. 1 is an electrical schematic in block diagram form which illustrates an electronic roll-a-long switch in accordance with the present invention.

With reference first to FIG. 1, there is illustrated an embodiment of an electronic roll-a-long switch in accordance with the present invention for use in a seismic exploration system including a plurality of receiver points 101–108, which are located at spaced intervals along the earth's surface. The receiver points are assigned sequential numbers, e.g., 101–108, as shown. Each receiver point is connected to the output of a geophone array (not shown).

In the illustrative embodiment of FIG. 1, there are eight receiver points. In accordance with the present invention, electronic roll-a-long switch 100 comprises one-half as many input channels as there are receiver points. Accordingly, for the illustrative embodiment of FIG. 1, four input channels are provided.

Each input channel includes an input switch, which may, for example, be a two-position relay. The input switches in the form of relays are designated 109–112 in FIG. 1.

In accordance with the present invention, electronic roll-a-long switch 100 functions to connect one of two receiver points to each input channel. The two receiver points which are connected to each input are spaced apart a number of receiver points equal to one-half the total number of receiver points. In the case of the embodiment of FIG. 1, the two receiver points which are connected to each input switch of each input channel are spaced four receiver points apart. That is, receiver points 101 and 105 are connected to the positions of input relay 109; receiver points 102 and 106 are connected to the positions of relay 110; etc. When each relay is in the "A" position as shown in FIG. 1, receiver points 101–104 are connected to the four input channels of roll-a-long switch 100.

Each input channel also includes a preamplifier, and such preamplifiers are designated 113–116 in FIG. 1. The inputs to preamplifiers 113–116 are connected respectively to input switches 109–112. The outputs of preamplifiers 113–116 are connected to the inputs of multiplexer 130, which functions to time-division multiplex it.s inputs to a common output. Multiplexer 130 may, for example, comprise a plurality of FET switches 117–120, such as shown in FIG. 1. The sources of FET switches 117–120 are joined in a common connection to form data bus 122.

Data bus 122 is connected to the input of an instantaneous floating point amplifier 123, which operates, if required, to amplify the signal on data bus 122 to keep it at a level within preselected limits. The output of instantaneous floating point amplifier 123 is fed to analog-to-digital converter 124, which converts the output of instantaneous floating point amplifier 123 to a digital word. That digital word is fed to recording apparatus (not shown) for appropriate handling.

The embodiment of electronic roll-a-long switch 100 of FIG. 1 also includes timing and control apparatus 121, which operates to control the setting of input switches 109–112. Also, timing and control circuitry 121 operates to control the order in which FET switches 117–120 are enabled to sequentially connect the data on each input channel to data bus 122 during each channel sample time of a record interval time. During each channel sample time, the enablement of FET switches occurs in an order corresponding to the sequential number of the receiver points which are connected to the input channels of roll-a-long switch 100.

In a preferred embodiment, timing and control apparatus 121 includes a microprocessor, such as the TMS 9900 which is manufactured by Texas Instruments. Timing and control apparatus 121 also includes a random access memory, into which data is stored by the microprocessor.

In operation, each relay comprising input switches 109–112 may first be set in its "A" position by timing and control apparatus 121. With such setting of input switches 109–112, receiver points 101–104 are connected to the input channels of roll-a-long switch 100. The signals received from receiver points 101–104 are preamplified by preamplifiers 113–116, respectively.

The outputs of preamplifiers 113–116 are time division multiplexed to data bus 122 when timing and control apparatus 121 operates to enable FET switches 117–120. For the example given, FET switches would be enabled in the order 117, 118, 119 and 120, to connect the outputs of preamplifiers 113, 114, 115 and 116, respectively, to data bus 122 during each channel sample time. This sequential enablement of FET switches occurs as follows:

Prior to the first record interval time, the microprocessor determines the order in which the FET switches comprising the multiplexer are to be enabled for each channel sample time. Data words representative of the order in which the FET switches are to be enabled are stored in sequential locations of the memory. During each channel sample time, the first data word is read from the memory and decoded, and the FET switch corresponding thereto is enabled; then the second word is read and decoded, and the FET switch corresponding thereto is enabled; etc. For the example given, the memory contains data words, which, when decoded, cause FET switches 117–120 to be enabled in the order 117, 118, 119, 120. That order of enablement corresponds to the sequential numbers of the receiver points (101–104) connected to the input channels.

During a second record interval time, data will be obtained from receiver points 102–105. Prior to the second record interval time, timing and control apparatus 121 operates to enable receiver points 102–105 to be connected to the input channels of roll-a-long switch 100. This is accomplished by timing and control apparatus 121 providing signals to cause input switches 110–112 to remain in the "A" position shown in FIG. 1, while also providing a signal to cause input switch 109 to switch to the "B" position shown.

During the second record interval time, FET switches must be enabled in the order 118, 119, 120, 117 for each channel sample time. This order is required so that data is presented to data bus 122 in an order corresponding to the sequential numbers of the receiver points (102–105) which are connected to the input channels. Prior to the second record interval, the microprocessor in timing and control apparatus 121 generates new data words for storage in the random access memory, which re-order the sequence of enablement of FET switches 117–120. These data words, when decoded during the second record interval, cause FET switches 117–120 to be enabled in the order 118, 119, 120, 117 to connect the outputs of preamplifiers 114, 115, 116, and 113 to data bus 122. Thus, timing and control apparatus 121 operates to connect the input channels of roll-a-long switch 100 to data bus 122 in the order corresponding to the sequential numbers of the receiver points, i.e. 102–105, which are connected to input channels of roll-a-long switch 100.

Prior to a third record interval time, timing and control apparatus 121 provides signals to cause input switch 109 to remain in the "B" position and to cause input switches 111 and 112 to remain in the "A" positions as shown in FIG. 1. However, timing and control apparatus also operates to provide a signal to cause input switch 110 to change to its "B" position. Thus, the inputs to the roll-a-long switch 100 during this third record interval time are receiver points 103–106.

Prior to the third record interval time, timing and control apparatus again re-orders the sequence of enablement of the FET switches of multiplexer 130, so that the sequence of connection of the input channels to signal bus 122 during each channel sample time of the third record interval is also in an order corresponding to the sequential numbers of the receiver points which are connected to the input channels. For each channel sample time of this third record interval, the enablement of FET switches 117–120 is in the order 119, 120, 117, 118 to connect the outputs of amplifier 115, 116, 113, and 114, respectively, to data bus 122.

Figure 2:
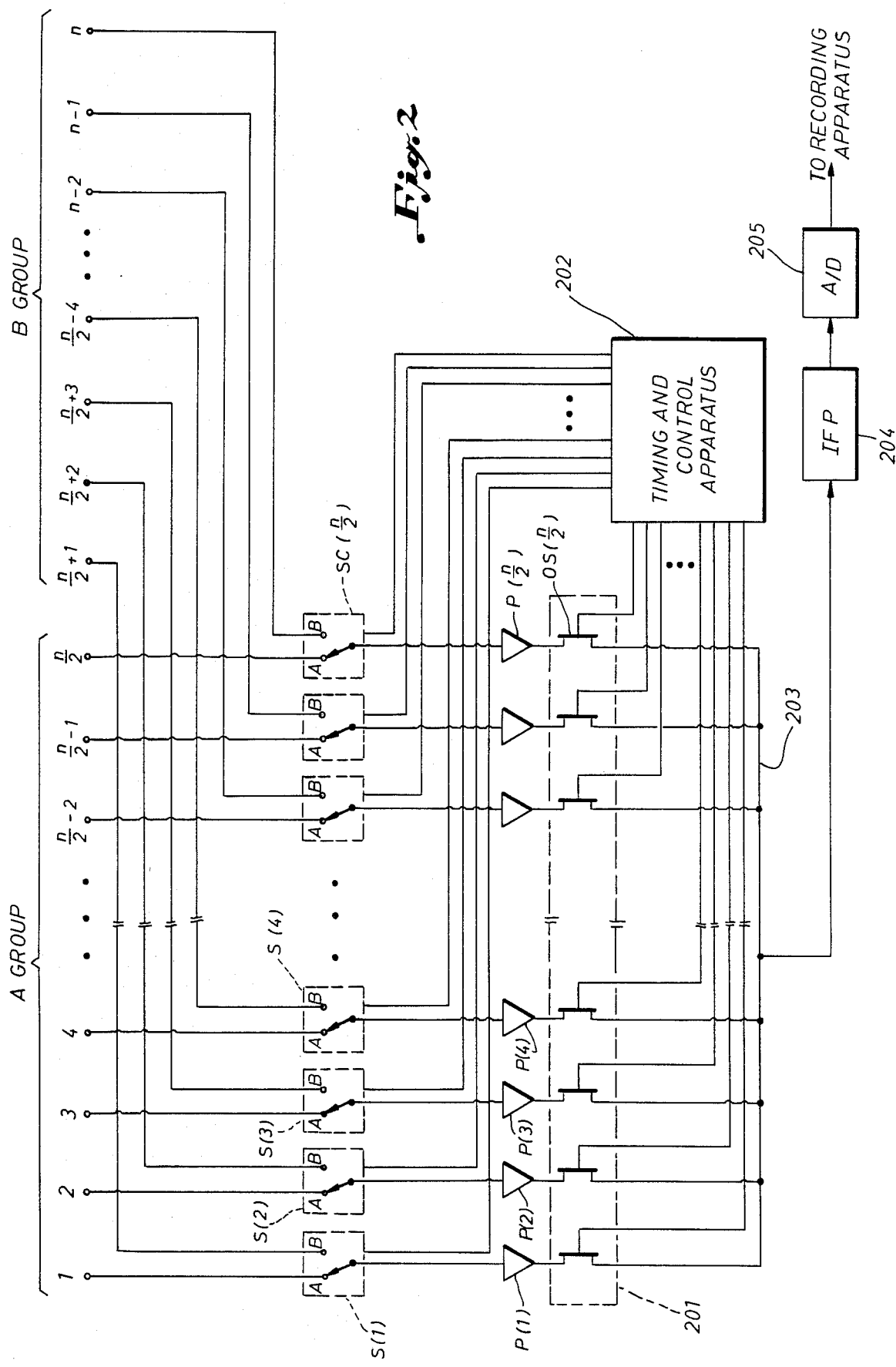
FIG. 2 is an electrical schematic in block diagram form which illustrates a portion of a presently preferred embodiment of an electronic roll-a-long switch in accordance with the present invention.
Figure 3A:
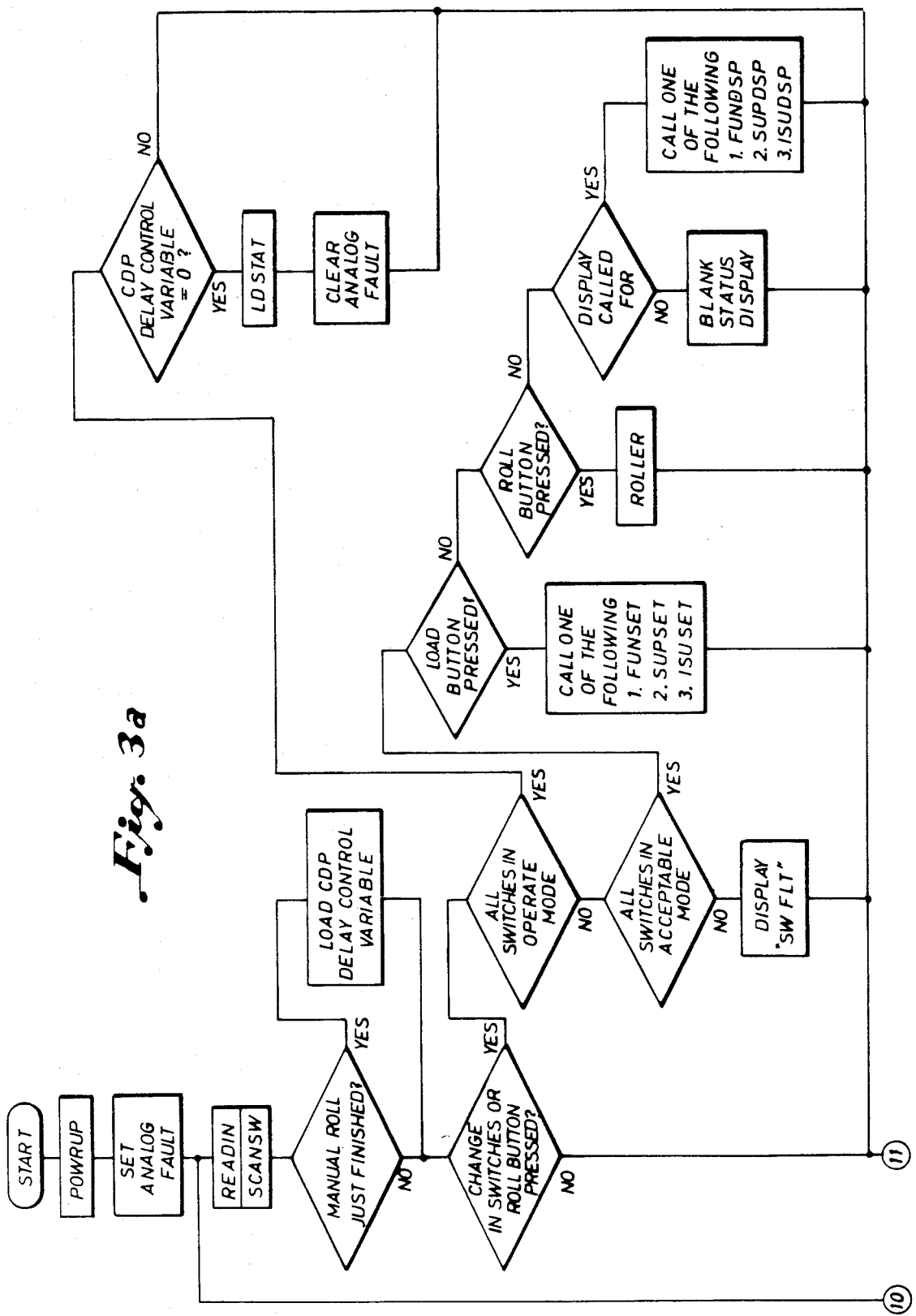
Figure 3B:
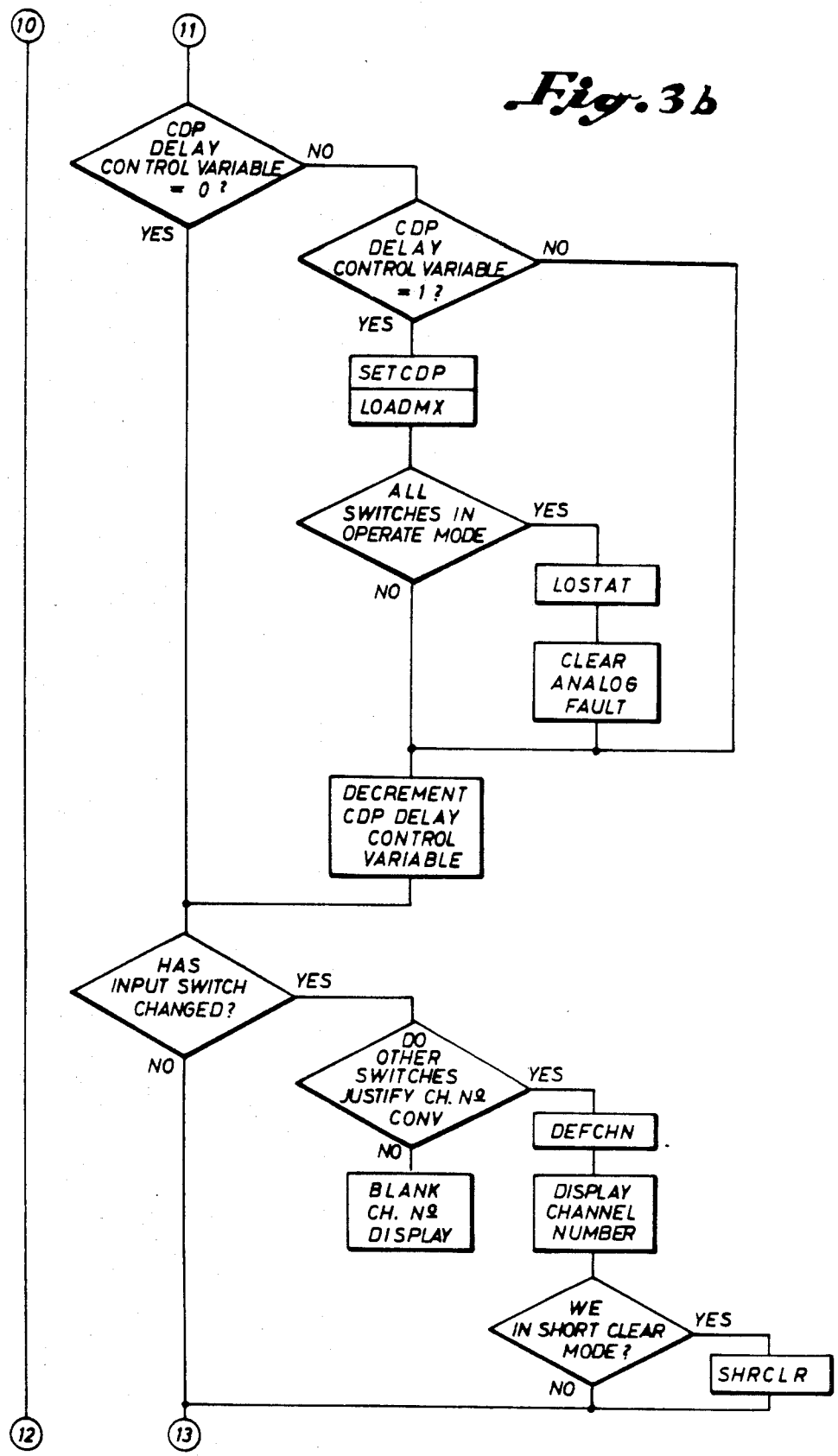

Having described the operation of a simplified embodiment of the present invention, reference should now be made to FIG. 2, where there is illustrated a generalized electrical schematic of a presently preferred embodiment of the present invention. Located at spaced intervals along the earth's surface are a number N of receiver points, each of which is connected to the output of a seismic detector array (not shown). These receiver points are divided into two groups which are labelled "A" group and "B" group, respectively. N/2 receiver points are contained in each group of receiver points. The receiver points are sequentially numbered, e.g., from 1 to N, as shown in FIG. 2. Of course, any other suitable numbering system may be used for the receiver points.

Still referring to FIG. 2, a roll-a-long switch in accordance with the present invention comprises N/2 input channels, and each input channel includes a number of input switches designated S(1) through S(N/2). Each input switch is a two-position switch, and preferably takes the form of a relay, such as the S2E-L2-12V relay which is manufactured by Aromat. The two positions of each input switch are labelled A and B, respectively. The "A" position of each input switch S(1) through S(N/2) is connected to one of the receiver points in group A, i.e. 1 through N/2. The "B" position of each input switch S(1) through S(N/2) is connected to receiver points of group B, i.e. (N/2+1) through N.

Each input channel of the embodiment illustrated in FIG. 2 further comprises a preamplifier, and the preamplifiers are designated P(1) through P(N/2). The input to each preamplifier P(1) through P(N/2) is connected to input switches S(1) through S(N/2), respectively. Each preamplifier P(1) through P(N/2) may, for example, be a custom quad preamp type device such as manufactured by Geosource Inc. of Houston, Tex.

Connected to the outputs of preamplifiers P(1) through P(N/2) is multiplexer 201, which operates to sequentially connect each input channel of the roll-a-long switch to data bus 203 during each channel sample time of a record interval time. Multiplexer 201 may, for example, comprise a plurality of FET switches, which are designated OS(1) through OS(N/2) in FIG. 2. The drains of the FET switches are connected to the respective outputs of its associated preamplifier, and the sources of the FET switches are joined in common connection to form data bus 203. The gates of the FET switches are connected to outputs of timing and control apparatus 204. Multiplexer 201 preferably comprises a plurality of DG307BP type devices, such as manufactured by Siliconix, Inc.

In operation, timing and control apparatus 202 functions to select a first group of N/2 receiver points to be connected to the input channels of the roll-a-long switch. Such first group of N/2 receiver points, may, for example, be receiver points 1 through N/2. Timing and control apparatus 202 may, however, be programmed to initially select a different group of N/2 receiver points to be connected to the input channels. Assuming that receiver points 1 through N/2 are the initial group of receiver points selected, timing and control apparatus 202 generates appropriate signals to cause all input switches S(1) through S(N/2) to be placed in the "A" position as shown.

Following a seismic disturbance, data which are available at receiver points 1 through N/2 are connected to the input channels and are preamplified by preamplifiers P(1) through P(N/2). Timing and control apparatus 202 operates during each channel sample time to connect each input channel to data bus 203 in an order corresponding to the sequential number of the receiver points presently connected to the input channels of the roll-a-long switch. The order of enablement is determined by a microprocessor, in the manner described above with reference to FIG. 1. In the above example, timing and control apparatus 202 operates during each channel sample time to enable switches OS(1) through OS(N/2) in the following order: OS(1), OS(2), . . . , OS(N/2), etc. Signals on data bus 203 appear in an order corresponding to the sequential numbers of the receiver points which are connected to the input channels, i.e. 1 through N/2. The signals are amplified by instantaneous floating point amplifier 204, if required, and then fed to analog-to-digital converter 205. The output of analog-to-digital converter 205 is fed to recording apparatus (not shown) for appropriate storage of the digitized signal.

Prior to the second record interval time, timing and control apparatus 202 operates to cause one of the input switches to switch to its other position, so that a different group of N/2 receiver points is connected to the input channels. For the example given, timing and control apparatus 202 provides a signal to cause input switch S(1) to change to the "B" position, while providing signals to cause all other switches to remain in the "A" position. In this arrangement, data from receiver points 2 through (N/2+1) are connected to the input channels of the roll-a-long switch. Accordingly, the roll-a-long switch has "rolled" to connect a new set of N/2 receiver points to the input channels.

During each channel sample time of the second record interval, timing and control apparatus 202 operates to enable the output switches of multiplexer 201 in the following order OS(2), OS(3), . . . OS(N/2), OS(1). Prior to the second record interval, timing and control apparatus 202 operated to re-order multiplexer 201 in the manner described above with reference to FIG. 1. Thus, the input channels of the roll-a-long switch are connected to the data bus 203 in an order corresponding to the sequential numbers of the receiver points connected to the input channels, i.e., 2 through (N/2+1) in this second example.

The process may continue up to N/2 times, and, during the N/2 th repetition, timing and control apparatus 202 generates signals which cause all input switches S(1) through S(N/2) to be in the "B" position. During this N/2 th recording interval, receiver points (N/2+1) through N supply data to data bus 203.

The foregoing has assumed that the recording system has the capacity for recording N/2 channels of information. It is commonly the case, however, that the channel capacity of the system, which will be designated M, is less than N/2. In one configuration of a system with which the invention is adapted for use, N/2 is equal to 132, while M is equal to 120 channels.

Accordingly, in a preferred embodiment of the invention, the values of M and N/2 are programmed into timing and control apparatus 202. In the situations where M is equal to N/2, the roll-a-long switch operates as described above. However, where M is less than N/2, the roll-a-long switch 202 operates to only connect M of the N/2 input channels to data bus 203 during each channel sample time of a recording interval.

In seismic exploration, it is often desirable to separate the M receiver points which are providing data into two groups, with a "gap" of receiver points between the two groups. During a record interval time, data are not recorded from the receiver points in the "gap". When such a gap is used, it is not uncommon to activate a seismic source at a location in the gap.

In a preferred embodiment of the present invention, timing and control apparatus 202 is programmed not only with the channel capacity, M, of the recording apparatus and the number of input channels, N/2, but also with the number of receiver points in the gap and the initial receiver point at which the gap begins. Of course, the maximum number of receiver points that can be in the gap is N/2 minus M.

By way of example, suppose that there are 264 receiver points (i.e., N=264) in the system and that the recording apparatus has a capacity of 120 channels. Suppose further that: (1) the receiver points are numbered one through 264; (2) that a gap of twelve receiver points is desired; (3) recording is to commence with receiver point 1; and (4) the gap for the first group of N/2 receiver points is to commence with receiver point sixty-one. In such example, the first gap includes recording stations sixty-one through seventy-two.

With the above information programmed into timing and control apparatus 202, signals are generated by timing and control apparatus 202 to cause all input switches S(1) through S(N/2) to initially be set in the "A" position. During each channel sample time of a first record interval time, data are recorded from receiver points one through sixty and seventy-three through 132. Timing and control apparatus 202 enables output switches OS(1)–OS(60) and OS(73)–OS(132) in that order during each channel sample time of the first record interval time.

Prior to the second record interval time, timing and control apparatus 202 generates a signal to cause input switch S(1) to change to its "B" position and generates signals to cause each switch S(2) through S(132) to remain in the "A" position. During the second record interval, data are recorded from receiver points two through sixty-one and seventy-four through 133. Timing and control apparatus 202 enables output switches in the order OS(2)–OS(61), OS(74)–OS(132), OS(1), during each channel sample time of the second record interval.

During the N/2 th repetition of the above process, each input switch S(1) through S(N/2) is in its "B" position, and data are recorded from receiver points 133-192 and 205-264.

In each of the foregoing examples, recording of data has commenced with each input switch in its "A" position and has proceeded until each input switch is in its "B" position. It will be understood that with the roll-a-long switch of the present invention, recording of a data can commence with any desired group of N/2 receiver points.

Now referring to FIG. 4a there is illustrated one embodiment of a portion of the input channels shown in FIGS. 1 and 2. Each input switch S(i) [i=1, 2, . . . , N/2] comprises a double-pole, double-throw switch, as shown. When switch S(i) is in the position shown in FIG. 4a, data from the receiver point connected to the "A" position is connected to the input channel. When the timing and control apparatus causes switch S(i) to change position, the input channel receives input from the receiver point connected to the "B" input of switch S(i).

Line filter 403 is provided in each input channel and is available from Geosource Inc. of Houston, Texas. The functions of line filter 403 are to filter out RF energy appearing on the cable and to attenuate noise from static discharges.

Now referring to FIG. 4b, there is illustrated a preferred embodiment of each input switch S(i) [i=1, 2, . . . N/2] of each input channel shown in FIGS. 1 and 2, and the logic circuitry which controls the operation thereof. Input switch S(i) comprises latching relays 410–412, each of which is preferably an S2E-L2-12V relay, such as manufactured by Aromat. Each relay 410–412 includes two coils which are connected in series, and two ganged, double-pole, double-throw switches, as shown. The series combination of the coils of relay 410 is connected between the Q7 and Q6 outputs of relay driver 413; the series combination of the coils of relay 411 is connected between the Q6 and Q5 outputs of relay driver 413; and the series combination of the coils of relay 412 is connected between the Q5 and Q4 outputs of relay driver 413. The input side of each switch in relay 410 is connected to INPUT A, which represents the output of a receiver point in group A (FIG. 2). One side of each switch in relay 411 is connected to INPUT B, which represents the output of a receiver point in group B (FIG. 2) which is spaced N/2 receiver points away from the receiver point connected to relay 410. The output sides of two switches in relay 410 and the output sides of two switches in relay 411 are joined in common connection to the input sides of relay 412. The output sides of two switches in relay 412 are connected to line filter 403.

Each relay 410–412 operates as follows, reference being made to relay 410 to describe that operation. When output Q7 of relay driver 413 is a logic 1 (i.e., fifteen volts) and when output Q6 of relay driver 413 is a logic 0 (i.e., zero volts), the switches in relay 410 assume the positions shown. The switches remain in those positions until such time as a reversed polarity of voltage is applied across the coil. Such change in polarity is effected when output Q6 of relay driver 413 is a logic 1 and output Q7 of relay driver 413 is a logic 0. When the polarity of the voltage across the coil is changed, each switch in relay 410 assumes the opposite position from that shown in FIG. 4b.

The remaining outputs of relay driver 413 are connected to the coils of relays in other input channels of the roll-a-long switch. One embodiment of the roll-a-long switch of the present invention comprises 132 input channels, and sixty-four relay drivers 413 are required to effect control of the relays in the input channels of that embodiment. Relay driver 413 is preferably a 74C374 type device, such as manufactured by National Semiconductor.

Relay driver 413 receives eight bits of data (D8–D15) from the microprocessor in timing and control apparatus 202 (FIG. 2). Data bits D8–D15 are loaded into relay driver 413 by the signal CLOCK, which also originates from the microprocessor. The microprocessor also generates data bits D5–D7, which are loaded into latch 414 by the signal CLOCK. The outputs of latch 414 are fed to decoder 415.

When relay driver 413 is enabled, the outputs thereof are a logic 1 or logic 0 depending on the data provided by the microprocessor. When relay driver 413 is not enabled, the outputs thereof are in a high impedance state. The function of decoder 415 is to decode bits D5–D7 and enable the relay driver corresponding thereto.

In operation, suppose that the first group N/2 receiver points to be connected to the input channels of the roll-a-long switch are receiver points 1 through N/2 (FIG. 2). In such case, the microprocessor generates data words prior to the first record interval to cause: (1) relay 410 of each input channel to set its switches as shown in FIG. 4b; (2) each relay 411 of each input channel to set its switches set as shown in FIG. 4b; and (3) each input switch 412 to set its switches as shown in FIG. 4b. With such switch settings, data is passed through relay 410 and relay 412 to line filter 403 and preamplifier 404. During the second record interval time, input channel 1 is to be connected to receiver point N/2+1, and, accordingly, prior to the second record interval the microprocessor in timing and control apparatus 201 produces data words D5–D15 which cause the switches in relays 410, 411 of the first input channel to change positions.

Referring to FIG. 4b, the output sides of two switches in relays. 410–412 are connected to TEST BUS 1, TEST BUS 3, and TEST BUS 2, respectively. TEST BUS 1 and TEST BUS 3 are primarily utilized to perform leakage and continuity checks on the cable connecting the roll-a-long switch to the receiver points and to short unrecorded inputs to reduce cross feed during recording. Such leakage and continuity checks may be made on channels which are not providing data.

TEST BUS 2 is primarily utilized for wire line communication between the recording vehicle and a receiver point connected as an input to relay 410 or relay 411, and to perform leakage and continuity checks. Typically, wire line communication is made with a receiver point in the "gap", i.e. one which is not providing data during a record interval.

Now referring to FIGS. 3a–3d, there is shown a flow diagram which illustrates the operation of the microprocessor of timing and control apparatus 202 of FIG. 2. It is believed that such flow diagram is sufficient to enable one skilled in the art to make and use timing and control apparatus 202.

It is to be understood that the intent of the following claims is to cover not only the situation where N/2 equals M, but also the situation where N/2 is greater than M.

We claim:

1. An electronic roll-a-long switch for use in a seismic exploration system, said system including N receiver points for receiving signals from seismic detectors, which receiver points are sequentially numbered and located at spaced intervals along the earth's surface, and a recording system having channels for recording seismic data, comprising:

N/2 input channels for receiving signals from a group of N/2 receiver points, each said input channel including selection circuitry for individually selecting one of two receiver points for connection to a designated channel, the two said receiver points for each designated channel being spaced N/2 receiver points apart, and a multiplexer for time multiplexing the signal on each input channel to a signal bus; and timing and control apparatus including circuitry:

(a) for operating the multiplexer during each channel sample time of a record interval time to select a group of M channels from the N/2 input channels to be data channels and to connect said group of M data channels to the signal bus in a sequential order corresponding to the sequential numbers of the receiver points from which group of data channels were selected; and (b) for operating the selection circuitry to change the group N/2 receiver points which are connected to the input channels during a subsequent interval time.

2. The roll-a-long switch of claim 1, wherein the timing and control apparatus further includes circuitry for shorting all receiver points from which data are not recorded during a record interval.

3. The roll-a-long switch of claim 1, wherein each input channel comprises:

a preamplifier having an input and an output; and a two-position, electronic input switch, for connecting the input of the preamplifier in the input channel to either of two receiver points.

4. The roll-a-long switch of claim 3, wherein the multiplexer comprises N/2 output switches, one output switch for each channel, for connecting the preamplified input of the channel to the signal bus.

5. The roll-a-long switch of claim 3, wherein each input switch comprises an electronic relay.

6. The roll-a-long switch of claim 4, wherein each output switch comprises an FET switch.

7. The roll-a-long switch of claims 3, 4, 5, or 6 wherein the timing and control circuitry comprises a microcomputer.

8. An electronic roll-a-long switch for use in a seismic exploration system, said system including N receiver points, which are sequentially numbered and which are located at spaced intervals along the earth's surface, and a recording system having M channels for recording seismic data, comprising:
   N/2 input channels, each channel including a preamplifier having an input and an output, and a two possible-position, electronic input switch for connecting the input of its associated preamplifier to either of two receiver points which are spaced N/2 receiver points apart;
   a multiplexer for time-division multiplexing the outputs of the preamplifiers to a signal bus;
   timing and control circuitry for operating the multiplexer during each channel sample time of a record interval time to connect the preamplified signals from a group of M receiver points to the signal bus in a sequential order corresponding to the sequential numbers of the receiver points of that group, and for changing the group of N/2 receiver points which are connected to the inputs of the preamplifiers during a successive recording interval.

9. The roll-a-long switch of claim 8, wherein each input switch comprises a relay.

10. The roll-a-long switch of claim 8, wherein the multiplexer comprises a plurality of FET switches.

11. The roll-a-long switch of claims 8, 9, or 10, wherein the timing and control circuitry comprises a microcomputer.

12. A method of gathering seismic data using a seismic exploration system having a line of N receiver points, which are sequentially numbered and which are located at spaced intervals on the earth's surface, and having M channels for recording seismic data, comprising the steps of:
   establishing an electronic roll-a-long switch having N/2 input channels;
   individually and selectively connecting one of two possible receiver points to each of said input channels, said two possible receiver points distributed at N/2 receiver points along said line;
   multiplexing the M of the N/2 input channels to a signal bus during each channel sample time of a record interval time in a sequence corresponding to the sequence numbers of the receiver points constituting said M channels; and
   changing the group of N/2 receiver points which are connected to the input channels during a subsequent record interval time.

\* \* \* \* \*

UNITED STATES PATENT AND TRADEMARK OFFICE
CERTIFICATE OF CORRECTION

PATENT NO. : 4,519,052

DATED : May 21, 1985

INVENTOR(S) : Donnie J. Tantillo, David F. Kratochvil, Robert G. Moore and Edward M. Browne It is certified that error appears in the above-identified patent and that said Letters Patent is hereby corrected as shown below:

Column 6, line 42, after "Such" please insert --a--.

Claim 1, line 38, after "having" please insert --M--.

Claim 8, line 23, please delete "possible".

Claim 8, line 25, after "two" please insert --possible--.

Signed and Sealed this

Fourth Day of February 1986

[SEAL]

Attest:

DONALD J. QUIGG

Attesting Officer

Commissioner of Patents and Trademarks